Aug. 21, 1951     A. WALLINGSFORD     2,565,009
MACHINE FOR SPLICING AND REPAIRING FILM
Filed Dec. 6, 1944     2 Sheets-Sheet 1
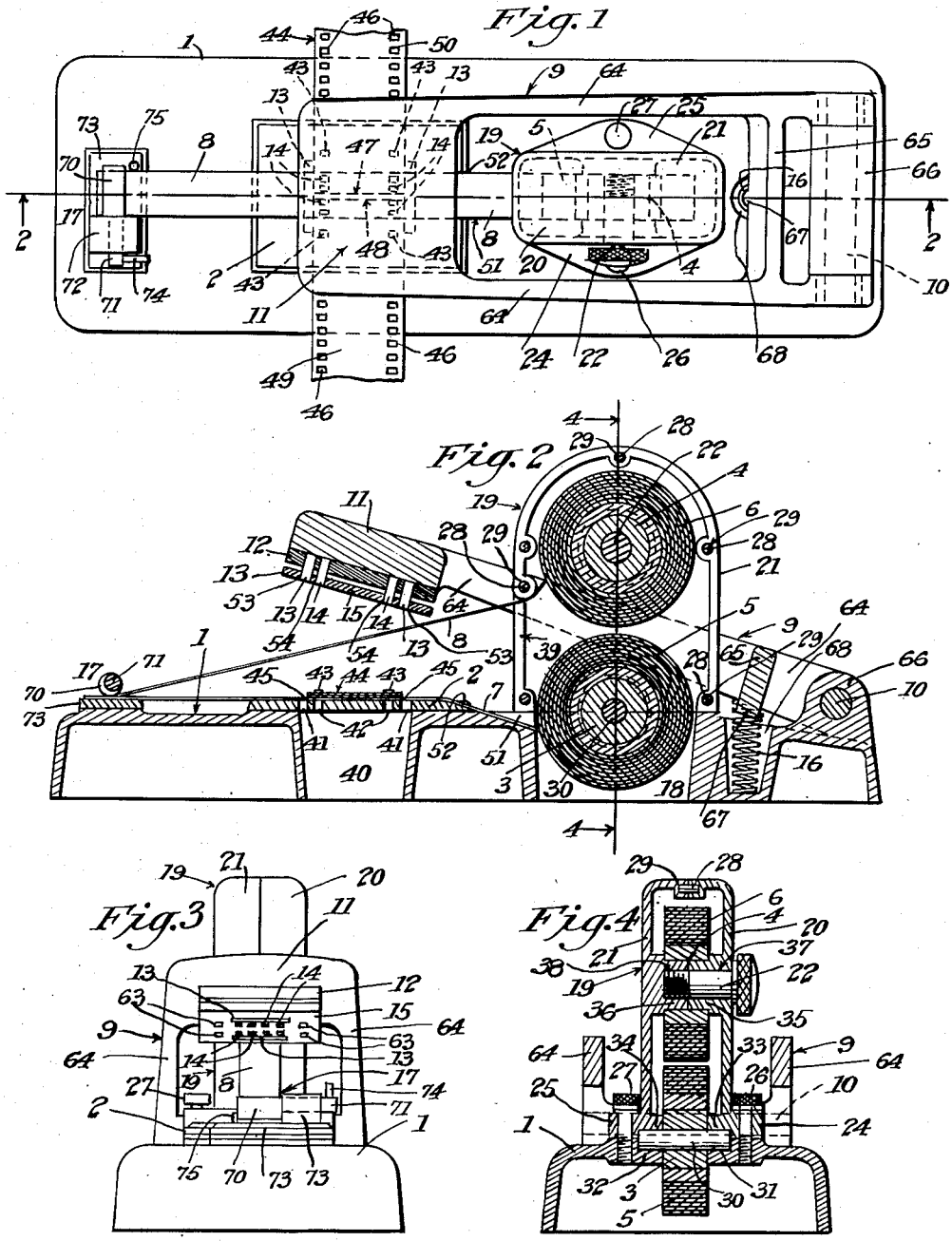
INVENTOR:
Armour Wallingsford,
BY
Alan Franklin,
ATTORNEY.

Aug. 21, 1951 A. WALLINGSFORD 2,565,009
MACHINE FOR SPLICING AND REPAIRING FILM
Filed Dec. 6, 1944 2 Sheets-Sheet 2
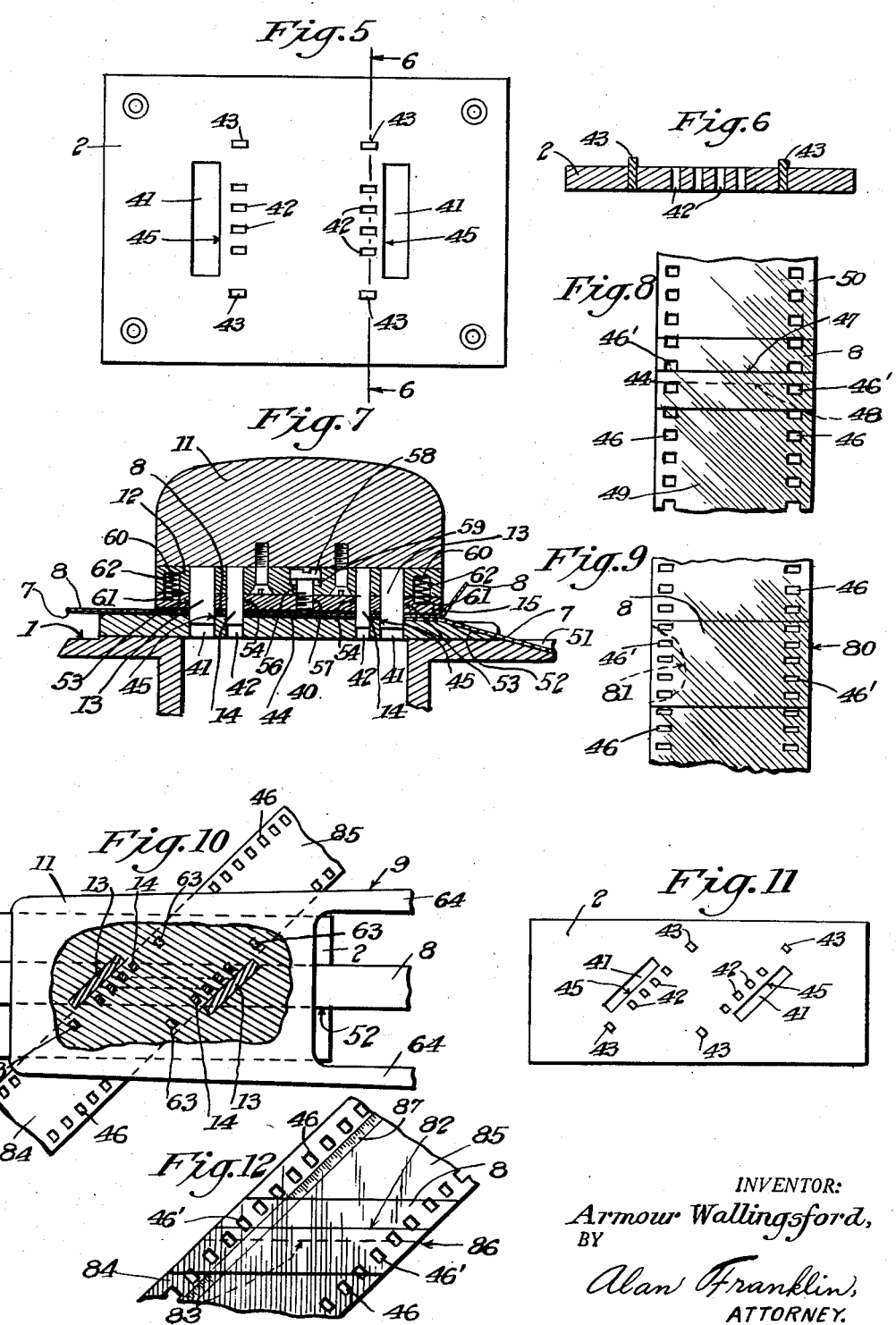
INVENTOR:
Armour Wallingsford,
BY
Alan Franklin,
ATTORNEY.

Patented Aug. 21, 1951

2,565,009

UNITED STATES PATENT OFFICE 2,565,009

MACHINE FOR SPLICING AND REPAIRING FILM

Armour Wallingsford, Los Angeles, Calif.

Application December 6, 1944, Serial No. 566,895

8 Claims. (Cl. 154—42.1)

This invention relates to means, and a machine for splicing and repairing film.

One of the objects of the invention is to provide a novel and improved means for splicing together adjoining ends of sections of a film and for repairing broken and damaged film.

Another object of the invention is to provide a novel and efficient machine for splicing together adjoining ends of sections of a film and for repairing broken and damaged film.

Another object is to provide a spliced film with the ends of adjoining sections of the film spliced together in overlapping relation with adhesive transparent material such as adhesive cellophane tape.

Another object is to provide a novel, simple and efficient machine for splicing together adjoining ends of sections of a film with adhesive transparent tape, such as adhesive cellophane tape, and for repairing broken and damaged film with such tape.

Another object is to provide a portable machine of the character stated for splicing or repairing film anywhere that the film may happen to be when splicing or repairing the same is required.

A further object is to provide a novel and improved means and machine for splicing sound film in such manner as to avoid objectionable sound when the splice in the film comes before a sound projector.

Other objects and advantages will appear hereinafter as this specification progresses.

The invention is illustrated in the annexed drawings which form a part of this specification and in which:

Fig. 1 is a plan view of my machine for splicing and repairing film.

Fig. 2 is a longitudinal vertical section of my film splicing and repairing machine taken on line 2—2 of Fig. 1.

Fig. 3 is a front end elevation of my film splicing and repairing machine.

Fig. 4 is a transverse vertical section of my film splicing and repairing machine taken on line 4—4 of Fig. 2.

Fig. 5 is a plan view of the anvil and die of my film splicing and repairing machine.

Fig. 6 is a transverse vertical section of said anvil and die taken on line 6—6 of Fig. 5.

Fig. 7 is a longitudinal vertical section on an enlarged scale of the anvil and die, and the presser head, with the presser head depressed and in the act of pressing the adhesive tape against the upper and lower sides of the ends of adjoining sections of a film and of punching the perforations in said tape and cutting the tape along the side edges of said film.

Fig. 8 is a plan view of a film spliced by my invention.

Fig. 9 is a plan view of a film repaired by my invention.

Fig. 10 is a fragmentary plan view of a modification of my invention for splicing a sound film at an angle.

Fig. 11 is a plan view of the anvil and die of the modification of my invention shown in Fig. 10.

Fig. 12 is a plan view of sound film spliced at an angle by the modification of my invention shown in Figs. 10 and 11.

Referring more particularly to the drawings, in which the same reference numerals designate the same parts in all of the figures, my invention includes generally a base 1, a splicing anvil 2 mounted on said base; a pair of cylindrical cores 3 and 4 on which are turnably fitted rolls 5 and 6, respectively, of adhesive cellophane tape 7 and 8; a presser lever 9 pivoted at its rear end at 10 to the rear end of said base 1, and formed at its forward end with a presser head 11; a presser head plate 12 secured to the underside of said presser head and a pair of cutter blades 13, two rows of punches 14 and a pressure plate 15 mounted on the lower side of said pressure head plate 12; a presser-lever retracting spring 16; and a cam lock 17 for said adhesive cellophane tapes 7 and 8 mounted on the forward end of said base 1.

The base 1 is formed with a well 18 over which is secured a tape housing 19 for the rolls 5 and 6 of adhesive cellophane tape. Said housing 19 is formed in two vertical side sections 20 and 21 which are secured together at their inner edges by a thumb screw 22, with said edges coinciding with the longitudinal axis indicated by the section line 2—2 of my machine. On the lower outer side edges of the side sections 20 and 21 of the housing 19 are formed external base flanges 24 and 25, respectively, which flanges are secured to the base 1 by thumb screws 26 and 27 whereby said housing is detachably secured to said base over said well 18. Dowels 28 on the inner edge of the housing section 20 are fitted in sockets 29 in the inner edge of the housing section 21 for maintaining said sections in alignment with each other. The cylindrical core 3 for the roll 5 of cellophane tape 7 is secured on a shaft 30, the ends of which extend a short distance beyond the ends of said core and rest in half bearings 31 and 32 in the upper side edges of the well 18 and in half bearings 33 and 34 in the lower edges of the side walls of the housing sections 20 and 21, respectively. The cylindrical core 4 for the roll 6 of cellophane tape 8 is formed in two sections 35 and 36, the section 35 extending inwardly from the side wall of the housing section 20 and the section 36 extending inwardly from the side wall of the housing section 21, so that the inner ends of said core sections meet when said housing sections are brought together at their inner edges. The thumb screw 22 extends through an opening 37 in the side wall of the housing section 20 and the core section 35, and into a threaded opening 38 in the core section 36 in threaded engagement with the thread of said threaded opening, whereby the sections 20 and 21 of the housing 19, and the sections 35 and 36 of the core 4 are detachably held securely together. In the front walls of the sections 20 and 21 of the housing 19 is provided an opening 39 formed partly in each of said front walls, through which opening are extended forwardly the adhesive cellophane tapes 7 and 8 from the tape rolls 5 and 6, respectively.

The splicing anvil 2 is secured upon the upper side of the base 1, forwardly of the housing 19 and tape rolls 5 and 6, over a well 40 in said base, and said anvil is provided with two transverse blade receiving slots 41, and two rows of punch receiving openings 42 located directly over said well 40, while four film-positioning pins 43 extend upwardly from said anvil. The two blade-receiving slots 41 are spaced apart at a distance corresponding to the width of a motion picture film 44, so that the side edges 45 of said slots, which are nearer each other, may coincide with the side edges of a motion picture film placed on the anvil 2, across the same. The two rows of punch-receiving openings 42 are located respectively, near the side edges 45 of the blade-receiving slots 41 and in alignment with the two rows, respectively, of perforations 46 of said motion picture film 44, when said film is placed across the anvil 2 with its side edges coinciding with the side edges 45 of the blade-receiving slots 41.

There are preferably four openings 42 in each row of said openings, two of which, being located at each side of the longitudinal axis 2—2 of the anvil 2. Two of the pins 43 are located beyond the ends, respectively, of each row of punch-receiving openings 42 and in alignment with said openings. The punch-receiving openings 42 and the pins 43 are positioned to register with perforations 46 extending through overlapping ends 47 and 48 of two sections 49 and 50 of the film 44, when said film sections are placed across the anvil 2 with their overlapping ends coinciding with the axis 2—2 of my machine, which axis is also the longitudinal axis of said anvil. The pins 43 beyond the ends, respectively, of the rows of punch-receiving openings 42, are positioned at such distances from the said longitudinal axis of the anvil 2, that they are beyond the side edges, repectively, of the cellophane tapes 7 and 8, when said tapes are extended longitudinally and axially over the anvil 2, in the manner and for the purpose hereinafter more fully described. In the upper forward edge of the well 18 is formed a tape groove 51 for the cellophane tape 7, and in the upper rear edge of the anvil 2 is formed a tape groove 52 for said cellophane tape, which grooves guide said tape axially over said anvil when said tape is drawn forwardly from the tape roll 5 over the anvil 2.

On the pressure head 11 the cutter blades 13, and the punches 14 are secured at their upper portions in the presser head plate 12 and extend downwardly and slidably through openings 53 and 54, respectively, in the pressure plate 15 located below said presser head plate 12. Stop screws 55 extend downwardly and slidably through openings 56 in the presser head plate 12 and are threaded in openings 57 in the pressure plate 15, with the heads 58 of said screws countersunk in the upper side of said presser head plate in countersunk sockets 59 in the upper side of said presser head plate at the upper ends of said screw openings 56, so that said screw heads 58 engage the lower ends of said sockets and hold the pressure plate 15 on the presser head plate 12 in slightly-spaced relation below said presser head plate, when the presser lever 9 is swung upwardly and the pressure plate 15 is raised above the anvil 2, while said screw heads 58 rest in said countersunk sockets 59 within and below the upper side of said presser head plate 12, when the presser lever is swung down into its lowermost position over the anvil 2 and the pressure plate 15 is forced upwardly against the pressure head plate 12 by the engagement of the pressure plate 15, with the adhesive cellophane tape 8, with said tape and the tape 7 extended longitudinally and axially over the anvil 2, and the film 44 extended transversely over said anvil between said cellophane tapes 7 and 8, in the manner and for the purpose hereinafter more fully described. Coil springs 60 are fitted in aligned sockets 61 and 62 in the upper side of the pressure plate 15 and in the lower side of the presser-head plate 12, respectively, which springs force said pressure plate downwardly from the presser-head plate 12 until the heads 58 of the stop screws 55 engage the lower ends of the countersunk sockets 59, when the presser lever 9 is swung upwardly and the presser head 11 is raised above the anvil 2, as shown in Fig. 1 of the drawing, and which springs 60 resist and cushion the upward movement of the pressure plate 15 when the presser lever 9 is swung down and said pressure plate 15 engages the cellophane tape 8 over the film 44 and the cellophane tape 7 resting upon the anvil 2. The pressure plate 15 is provided with four openings 63 to receive the film-positioning pins 43, respectively, when the presser lever 9 is swung down and said pressure plate is brought close to the anvil 2. The presser level 9 comprises a pair of spaced side arm members 64, which are connected together near their rear ends by a cross bar 65, and to the forward ends of which are secured the presser head 11. The rear ends of said side arm members 64 are fitted adjacent the ends, respectively, of a transverse embossment 66 upstanding from the rear end of the base 1, and said rear ends of said arm members are turnably fitted on the ends, respectively, of the pivot 10, which is secured in said embossment and extends outwardly from the ends, respectively, thereof, whereby the presser lever 9 is pivoted at the rear end to the rear end of the base 1, with its side arm members 64 extending forwardly at opposite sides, respectively, of the tape housing 19, and with the presser head 11 positioned directly above the anvil 2. On the lower edge of the cross bar 65 is formed a depending stud 67 midway between the side arm members 64 of the presser lever 9, which stud is fitted in the upper end of the presser lever retracting spring 16 which is positioned in a well 68 in the base 1, with the lower end of said spring resting upon the bottom of said well and with the lower edge of the cross bar 65 resting upon the upper end of said spring, by means of which spring the presser lever 9 is normally swung into its uppermost position with the presser head 11 retracted from the anvil 2.

The cam lock 17 comprises a cylindrical cam 70 secured eccentrically on one end of a shaft 71 journaled in a bearing 72, upstanding from a plate 73 secured on the forward end of the base 1, in the outer end of which shaft is secured a pin handle 74 extending radially from said shaft, by means of which handle said shaft and cam 70 are turned for gripping and locking the forward ends of the adhesive cellophane tapes 7 and 8 between said cam and said plate 73. The inner end of the cam 70 is positioned adjacent the inner end of the bearing 72 while the handle 74 is positioned adjacent the outer end of said bearing, whereby the shaft 71 is maintained in said bearing. A guide pin 75 extends upwardly from the plate 73 adjacent the outer end of the cam 70 for engaging one of the side edges of the cellophane tapes 7 and 8, while the other side edges of said tapes engage the inner end of the bearing 72, whereby said tapes are guided between the cam 70 and the plates 73 along the longitudinal axis 2—2 of my machine.

The operation of my invention is as follows:

Normally the presser lever 9 is swung up into its uppermost position by the spring 16 with its presser head 11 raised above the anvil 2, while the adhesive cellophane tapes 7 and 8 are drawn forwardly from their rolls 5 and 6, respectively, through the opening 39 in the front wall of the tape housing 19, between the anvil 2 and the pressure plate 15 of the presser head 11 and the forward ends of said tapes are brought together between the plate 73 and the cam 70 of the cam lock 17, and the cam shaft 71 and said cam are turned by the handle 74 until said cam engages the uppermost cellophane tape 8 and grips the ends of the cellophane tapes 7 and 8 upon the plate 73, locking said tape in operative position, with adhesive surface of the lower tape 7 uppermost and the adhesive surface of the upper tape 8 lowermost and with said lower tape extending longitudinally axially over the anvil 2 and said upper tape extending forwardly and downwardly at an inclination directly over and in alignment with said lower tape and in contact with the lower rear edge of the pressure plate 15 of the pressure head 11.

A film 44 being cut transversely at predetermined points into two sections 49 and 50, the cut end portions of said sections are extended transversely between the adhesive cellophane tapes 7 and 8 and placed upon the upper adhesive side of the lower cellophane tape 7 over the anvil 2, with the cut-end portion of the section 49 at one side of the longitudinal axis 2—2 of said anvil and the cut-end portion of the section 50 at the other side of said axis, with the cut ends 47 and 48 of said sections against each other in overlapping relation, with the two pins 43 at one side of said axis of the anvil projecting through two perforations 46 of the film section 49 and with the other two pins 43 at the other side of said anvil axis projecting through two perforations 46 of the film section 50, and with the two foremost perforations 46 of the two rows of perforations of the film section 49 in registration with the two openings 42 of the two rows of said openings at one side of said anvil axis, and the two foremost perforations 46 of the two rows of perforations of the film section 50 in registration with the two openings 42 of the two rows of said openings at the other side of said anvil axis, thus positioning the film sections 49 and 50 in position to be spliced upon the anvil 2. The presser head 11 and presser lever 9 are then pressed down by the operator against the tension of the spring 16, whereupon the upper adhesive cellophane tape 8 is engaged by the pressure plate 15 of the pressure head 11 and pressed down horizontally until the lower adhesive side of said tape 8 is pressed firmly against the upper side of the cut end portions of the film sections 49 and 50 and said end portions of said film sections are pressed firmly against the upper adhesive side of the lower adhesive tape 7 upon the anvil 2 whereby said tapes 7 and 8 are caused to adhere firmly to the lower and upper sides, respectively, of the cut forward end portions of the film sections 49 and 50 directly over the overlapping cut ends 47 and 48 of said film sections, during which operations the pins 43 are projected into the openings 63 in the pressure plate 15 for accurately positioning the cut end portions of the film sections 49 and 50 for splicing the same, and the punches 14 are projected downwardly through the upper cellophane tape 8, perforations 46 in the end portions of the film sections 49 and 50, the lower cellophane tape 7 and into the openings 42 in the anvil 2, punching perforations 46' in the tapes 8 and 7, respectively, in registration with the perforations 46 in the film sections 49 and 50 under said tapes 8 and 7, while the cutter blades 13 are projected downwardly through the cellophane tapes 8 and 7 into the blade openings 41, cutting said tapes along the inner edges 45 of said openings and along the side edges of the cut end portions of the film sections 49 and 50, and thus completing the splicing together of cut ends 47 and 48 of said film sections. The presser head 11 is then released by the operator and the presser lever 9 and said presser head are then swung upwardly into their uppermost position by the spring 16, withdrawing the punches 14 from the anvil punch openings 42 and from the perforations 46' and 46 in the tapes 7 and 8 and in the film sections 49 and 50, respectively, and withdrawing the blades 13 from the anvil blade openings 41. The spliced film 44 is then removed from the anvil 2, and, with the perforations 46' punched in the cellophane tapes 7 and 8 in registration with the film perforations 46, the spliced film may be run through a motion picture projector. The cam lock 17 is then turned and disengaged from the forward ends of the forward cut-off portions of the tapes 7 and 8, and said forward cut-off portions of said tapes are removed from the machine and disposed of. The forward ends of the cellophane tapes 7 and 8 extending from the rolls 5 and 6, respectively, are then gripped, and said tapes are drawn forwardly over the anvil 2 and said forward ends of said tapes are locked by the cam lock 17. The machine is thus again set for repeating the above-described operations and splicing another film.

In the use of my machine for repairing a broken motion picture film 80, as shown in Fig. 9 of the drawing, the film at the place where it is broken and the broken part 81 of the film fitted in position in the film, are placed upon the adhesive tape 7 over the anvil 2, with the pins 43 projecting through four perforations 46 in the film and with other perforations 46 in registration with the openings 42 in the anvil, and the presser lever 9 and presser head 11 are pressed down until the adhesive cellophane tapes 7 and 8 are pressed into adhesive contact with the lower and upper sides, respectively, of the film 80 and its broken part 81, and perforations 46' are punched by the punches 14 in said tapes in registration with the perforations 46 in the film between said tapes and said tapes are cut by the blades 13 along the side edges of said film, thus repairing the film by securing the broken part 81 of the film 80 in position in the film by patches of the adhesive cellophane tapes 7 and 8.

The ends 82 and 83 of the sections 84 and 85 of a film 86 may be cut at an angle and spliced together in overlapping relation by my machine with the adhesive cellophane tapes 7 and 8, as above described and as illustrated in Fig. 12. The film 86 may be a silent motion-picture film, but more particularly a sound film, with a sound track 87, since the spliced ends of sections of sound film are cut at an angle to avoid the reproduction of objectionable sounds which are produced by the spliced ends of sound film sections having their ends cut directly straight across the film.

In splicing the ends of the film sections at an angle the cutter blades 13 and blade openings 41, punches 13 and punch openings 14 and the pins 43 and pin openings 63 are arranged at an angle in my machine, as illustrated in the modification of my invention shown in Figs. 10 and 11, the blades 13, punches 14 and punch openings 63 being arranged at an angle in the presser head 11 as shown in Fig. 10 and the blade openings 41, punch openings 42, and pins 43 being arranged at an angle in the anvil 2, as shown in Fig. 11.

I claim:

1. A machine for splicing film including an anvil, a presser head mounted to be swung toward or away from said anvil, means for operatively mounting two rolls of adhesive transparent tapes so that said tapes may be extended from said rolls between said anvil and said presser head, and between which tapes may be positioned adjoining ends of two sections of a film, a lock for locking the ends of said tapes when said tapes are extended between said anvil and said presser head, and while said presser head is pressed down toward said anvil for compressing said adhesive tapes against the opposite sides respectively, of said film sections.

2. A machine as set forth in claim 1, in which said anvil is provided with pairs of pins projecting upwardly from the upper face thereof for passing through certain pairs of the perforations in the film sections the adjacent ends of which are to be spliced, said pairs of pins centering the film sections on said anvil with relation to the adhesive tape which is held in a position crosswise of the overlapped ends of said film sections.

3. A machine as set forth in claim 1, in which said presser head is mounted on one end of a lever, the other end of which is pivotally supported on said base and including a spring engaging said presser lever for normally holding the same in a raised position with the presser head spaced above said anvil.

4. A machine as set forth in claim 1, including a housing mounted on said base between said anvil and the pivot axis of said presser lever, said housing having means for supporting rolls of adhesive tape, said housing extending upwardly through an opening in said presser lever.

5. A machine for splicing film including means for holding in position in overlapped relation adjacent ends of two sections of a film, means for holding an adhesive transparent tape in position over said overlapped ends of said film sections, pressure means for pressing said tape and said overlapped film ends together, and punches secured to said pressure means and movable therewith for punching perforations through said tape in registration with perforations in said film sections, when the adhesive tape and the overlapped ends of said film sections are pressed together by said pressure means.

6. A machine for splicing film including means for holding in position in overlapped relation adjacent ends of two sections of a film, means for holding an adhesive transparent tape in position over said overlapped ends of said film sections, pressure means for pressing said tape and said overlapped film ends together, and cutting means secured to said pressure means and movable therewith for cutting said adhesive tape along the side edges of said film sections, when the adhesive tape and the overlapped ends of said film sections are pressed together by said pressure means.

7. A machine for splicing film including a base, an anvil mounted on said base, a presser head mounted on said base to be moved toward or away from said anvil, means for holding the ends of two film sections in overlapping relation on said anvil, means for operatively mounting a roll of adhesive transparent tape upon said base whereby said tape may be extended from said roll over said overlapped ends of said film sections, while said presser head is pressed down, for pressing said adhesive tape against said overlapped ends of said film sections for splicing said ends together by said tape, and cutter blades secured on said movably mounted presser head for cutting the adhesive tape along the side edges of the film when said presser head is depressed toward said anvil.

8. A machine for splicing film including a base, an anvil mounted on said base, a presser head mounted on said base to be moved toward or away from said anvil, means for holding the ends of two film sections in overlapping relation on said anvil, means for operatively mounting a roll of adhesive transparent tape upon said base whereby said tape may be extended from said roll over said overlapped ends of said film sections, while said presser head is pressed down, for pressing said adhesive tape against said overlapped ends of said film sections for splicing said ends together by said tape, and punches secured on the presser head for punching perforations in the adhesive tape in registration with the perforations in the adjoining ends of the film sections positioned on the anvil, said anvil being provided with apertures for receiving the punches on the presser head when the latter is moved downwardly to press the adhesive tape and the film section ends together.

ARMOUR WALLINGSFORD.

REFERENCES CITED

The following references are of record in the file of this patent:

UNITED STATES PATENTS

| Number | Name | Date |
|---|---|---|
| 1,121,765 | Schultze | Dec. 22, 1914 |
| 1,396,895 | Stolz | Nov. 15, 1921 |
| 1,535,129 | Monacelli et al. | Apr. 28, 1925 |
| 1,598,445 | Howell | Aug. 31, 1926 |
| 1,730,929 | Flynn | Oct. 8, 1929 |
| 2,318,287 | Brolin | May 4, 1943 |
| 2,346,874 | Russell | Apr. 18, 1944 |